Patented June 24, 1952

2,601,256

UNITED STATES PATENT OFFICE 2,601,256

ACRYLONITRILE POLYMERS

Herman A. Bruson, Shaker Heights, Ohio, assignor to Industrial Rayon Corporation, Cleveland, Ohio, a corporation of Delaware No Drawing. Application October 27, 1950, Serial No. 192,639

21 Claims. (Cl. 260—79.3)

This invention relates to the preparation of acrylonitrile polymer materials and to the shaped articles formed therefrom such as, for example, fibers, films and the like, hereinafter referred to as fibers. More particularly, this invention is concerned with orientable fibers which possess improved hydrophilic properties.

Generally, it has been known in the prior art that certain polymers and copolymers of acrylonitrile are water-resistant in the form of films and fibers. Due to their failure to absorb moisture or perspiration, knitted or woven clothing made from such fibers feel clammy when worn.

It has now been found that a particular group of unsaturated organic sulfonates which are substantially non-polymerizable alone, can nevertheless be interpolymerized with acrylonitrile to form true copolymers; and further, it has been found that the copolymer compositions thus produced are particularly adapted to the formation of molecularly oriented fibers having improved affinity for moisture, yet which are strong when wet.

In accordance with the present invention, new water-insoluble, fiber-forming polymeric materials, synthetic fibers, etc., are prepared by polymerizing a mixture comprising acrylonitrile and an unsaturated sulfonic acid or a water-soluble salt thereof. The unsaturated sulfonic acids of the present invention have the formula

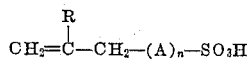

wherein $n$ is zero or 1, R is a member of the group consisting of hydrogen and methyl radicals; and A is a member of the group consisting of oxyalkylene, hydroxyalkyleneoxy, thioalkylenehydroxy and thioalkylene radicals having at least two carbon atoms where $n$ is equal to 1.

The percentage of acrylonitrile in the polymer molecule is at least about 85% by weight, and the percentage of sulfonic acid groups in the polymer molecule is at least about 0.75% by weight, and preferably between about 0.75% and 5.0%. In general, the amount of the sulfonates desirable in the copolymer should be substantially below that amount which will render the copolymer soluble in water. The amount varies somewhat from one sulfonate to another. In the preparation of the copolymer, it is advantageous, in general, to employ in the polymerization reaction an amount of the unsaturated sulfonate which is less than about 25% of the total weight of monomers employed since not all of the sulfonate employed combines with the acrylonitrile to form the copolymer.

Typical unsaturated sulfonates which can be copolymerized with acrylonitrile are, for example, the following:

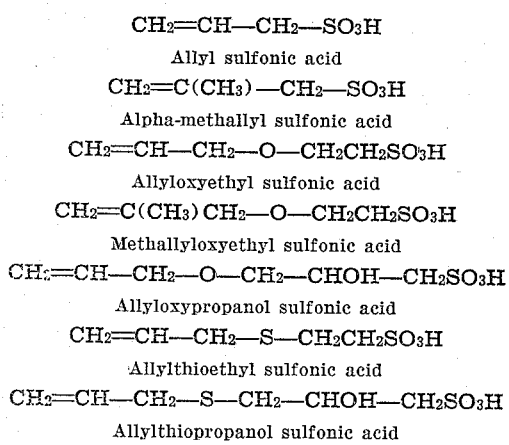

Instead of employing the sulfonate comonomers in the form of free sulfonic acids, it is often more advantageous to use them in the form of their water-soluble ammonium, substituted ammonium or metal salts, e. g., sodium, magnesium, potassium, lithium, zinc, calcium, aluminum or other metal salts.

Shaped articles may be prepared from solutions of the above-mentioned copolymers by extrusion into suitable coagulating media, e. g., evaporative atmospheres or liquid coagulating baths. If desired, various glycol coagulating baths may be used with advantage. Filamentary materials produced by such methods may be oriented to form fibers having high tenacity, high elastic recovery, low shrinkage, etc.

This invention will be more fully described by the following examples, although, it is understood that the invention is not intended to be limited by these examples. In the examples, "parts" and "percent" of material is intended to mean parts and percent by weight.

Example I

To a stirred mixture of 1200 parts distilled water, 10 parts sodium allyl sulfonate

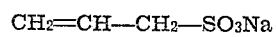

and 190 parts acrylonitrile at about 53° C. under an atmosphere of nitrogen, there was added 4.2 parts potassium persulfate and 1.78 parts sodium bisulfite. The temperature was permitted to rise to about 68° C. during the course of ten minutes and was maintained at 68–72° C. by occasional cooling. The mixture was then stirred for about 2½ hours longer at about 50° C. To the fine white polymer suspension, 400 parts of 1 N sulfuric acid was added and after stirring for thirty minutes, the mixture was filtered and the polymer washed thoroughly with distilled water and dried in an oven at about 65° C. Yield of copolymer was 188 parts (mol. wt. 55,000 to 60,000). This copolymer contained about 1.5% by weight of —SO₃H groups in the molecule.

The sodium allyl sulfonate used above was prepared by boiling a mixture of allyl chloride, sodium sulfite, water and alcohol under reflux for about twelve hours, distilling off the volatile liquids in vacuum and crystallizing the dry residue from alcohol. It formed colorless water-soluble crystals.

The dried copolymers prepared according to the above and later examples, were spun into fibers as follows. The copolymer was dissolved at about 95° C. in ethylene carbonate to form a solution containing about 20% by weight of the copolymer. This solution after filtering and deaerating in vacuo, was heated to 120° C. and extruded through a spinneret having 40 holes (.003 inch diameter) into a coagulating bath consisting of about 80 parts by weight of tri-ethylene glycol and 20 parts ethylene carbonate. The bath temperature was maintained at about 130° C. while the coagulated filaments were drawn through the bath for 30 inches of bath travel and then collected on a bobbin driven at a peripheral speed of about 44 meters per minute. The yarn was washed with water at room temperature and then led through a steam chamber maintained at 145° C. and from there to a collecting device rotating at a peripheral speed of 440 meters per minute so as to impart a ten-fold stretch. The stretched yarn was then passed over an internally-heated roll maintained at about 160° C. and relaxed to the extent of 14% of its length. The yarns thus obtained were about 90–100 denier and were white, lustrous and strong; showing, in general, a tenacity of about 4 to 4.5 grams per denier, and an elongation of about 16 to 18% at break.

Other coagulants can be used if desired in the wet-spinning process described above, notably diethylene glycol, tetraethylene glycol, dipropylene glycol, tripropylene glycol and the like.

Knitted or woven fabrics produced from these yarns, after laundering, i. e., washing and drying, show a higher degree of moisture regain than those made in an identical manner from homo-polymerized acrylonitrile. The fabrics also feel less clammy when worn.

*Example II*

A mixture of 1200 parts water, 10 parts alpha-methallyl sodium sulfonate $$CH_2=C(CH_3)-CH_2-SO_3Na$$

190 parts acrylonitrile, 4.5 parts potassium persulfate and 2 parts sodium bisulfite was reacted according to the procedure of Example I to yield a white powdery copolymer containing about 2% —SO₃H groups in the molecule. After washing and drying, the yield of copolymer was 187 parts (mol. wt. about 60,000).

The sodium methallyl sulfonate used above was prepared by boiling a mixture of methallyl chloride $CH_2=C(CH_3)CH_2Cl$, sodium sulfite, water and alcohol under reflux for about ten hours, distilling off the volatile liquids in vacuum and crystallizing the dry residue from alcohol. It formed colorless water-soluble crystals.

*Example III*

A mixture of 1200 parts water, 10 parts allyloxypropanol sodium sulfonate $$CH_2=CH-CH_2-O-CH_2CHOH-CH_2SO_3Na$$

190 parts acrylonitrile, 4.2 parts potassium persulfate and 1.78 parts sodium bisulfite was reacted according to the procedure of Example I. The yield of white powdery copolymer containing about 1.4% by weight of free sulfonic acid groups was 189 parts (mol. wt. 60,000–62,000).

The allyloxypropanol sodium sulfate used above was prepared by heating a mixture of allyl glycidyl ether,

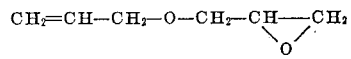

with sodium bisulfite, evaporating the reaction mixture to dryness and crystallizing the dry residue from alcohol. It formed colorless water-soluble crystals.

*Example IV*

A mixture of 1200 parts water, 15 parts allyl-thioethyl potassium sulfonate, $$CH_2=CH-CH_2-S-CH_2CH_2SO_3K$$

190 parts acrylonitrile, 4.2 parts potassium persulfate and 2 parts sodium bisulfite was reacted according to the procedure of Example I, to yield a white powdery copolymer containing about 0.98% —SO₃H groups. After washing and drying, the yield of copolymer was 190 parts.

The allylthioethyl potassium sulfonate used above can be prepared by boiling an equimolecular mixture of potassium 2-chloroethyl sulfonate and potassium allyl mercaptide in alcohol solution for eight hours, filtering off potassium chloride, and evaporating the filtrate to dryness.

*Example V*

To a rapidly stirred mixture of 1200 parts distilled water, 10 parts allyloxyethyl sodium sulfonate $CH_2=CH-CH_2-O-CH_2CH_2SO_3Na$, and 190 parts acrylonitrile at about 61° C., there was added 4.2 parts potassium persulfate in 40 parts water and then 1.8 parts sodium bisulfite in 20 parts water. The reaction was stirred at 60–67° C. for about four hours, then acidified with 400 parts of 1 N sulfuric acid. The white powdery copolymer was filtered off, washed and dried at about 65° C. Yield 184 parts (mol. wt. about 80,000). It contained about 1.09% —SO₃H groups by weight.

The allyloxyethyl sodium sulfonate used above was prepared by boiling allyl-2-chloroethyl ether with sodium sulfite in aqueous alcoholic solution, evaporating to dryness and crystallizing the residue from alcohol.

*Example VI*

The procedure of Example III was repeated at 62–70° C. using 1200 parts water, 20 parts allyloxypropanol sodium sulfonate $$CH_2=CH-CH_2-O-CH_2-CHOH-CH_2SO_3Na$$

180 parts acrylonitrile, 4.2 parts potassium persulfate and 1.8 parts sodium bisulfite. After acidification with 400 parts of 1 N sulfuric acid, the slurry was filtered, washed and dried to yield 180 parts of white powdery copolymer containing about 1.8% by weight of free sulfonic acid groups. The molecular weight was about 40,000.

*Example VII*

To a rapidly stirred mixture of 1200 parts distilled water, 10 parts allyl sodium sulfonate, 10 parts of 2-vinylpyridine, and 190 parts acrylonitrile at about 58° C. in an atmosphere of nitrogen, there was added 4.2 parts potassium persulfate in 50 parts water followed by 1.7 parts sodium bisulfite in 20 parts water. The temperature was maintained at 58–60° C. by occasional cooling. After four hours stirring at 55–60° C., the polymer slurry was acidified with 400 parts of 1 N sulfuric acid, filtered and washed. The yield of dried copolymer was 188 parts. Its analysis showed the presence of about 1.3% by weight of —$SO_3H$ groups. The molecular weight was about 40,000.

In the above examples, instead of employing the sodium salts of the unsaturated sulfonic acids in the polymerization reaction, other water-soluble salts may be employed, e. g., ammonium salts, or substituted ammonium salts such as the ethanolamine, diethanolamine, triethanolamine, or morpholine salts; or the corresponding potassium, calcium, magnesium, zinc or other metal salts. The sulfonic acid salt groups in the copolymers are advantageously converted to the free —$SO_3H$ groups by acidification with sulfuric acid as described in the examples above, before the spinning of the copolymers so as to yield lighter colored fibers.

As previously stated, the proportion of acrylonitrile in the new copolymers should be at least about 85% by weight and advantageously, at least about 90% by weight. Minor proportions (up to a total of about 10% by weight) of one or more other vinyl compounds can be copolymerized with the above monomers if desired, to yield tripolymers or tetrapolymers. Among such other monomers may be mentioned, for example: vinyl esters (vinyl acetate, vinyl formate, vinyl benzoate), vinyl ethers, and vinyl ketones; acrylic acid and its esters and amides; methacrylic acid and its esters, amides, and nitrile; maleic, itaconic, fumaric, crotonic acids and their esters, amides and nitriles; allyl alcohol and its esters and ethers; styrene and nuclear substituted styrenes, e. g. chloro- and dichloro styrene; halogenated monoethylenic compounds such as vinyl chloride, vinyl fluoride, and vinylidene chloride; N-vinyl compounds such as N-vinyl pyrrolidone, N-vinyl succinimide, N-vinyl carbazole; and the like. However, particular advantages are derived when a vinylpyridine is employed as an additional monomer. Thus, for example, tripolymers of acrylonitrile, 2- or 4-vinylpyridine (2 to 10%) and one of the unsaturated sulfonates of the present invention are particularly receptive to acid dyes, especially when about 2 to 4% of the vinylpyridine is present in the copolymer.

The copolymers of this invention may be prepared by any suitable polymerization method such as, for example, polymerization with oxygen-yielding catalysts, e. g., benzoyl peroxide, potassium or ammonium persulfate, etc. Redox polymerization systems employing oxygen-yielding catalysts such as the above in combination with reducing agents such as sodium bisulfite, sodium hydrosulfite, etc., may be used with advantage.

The molecular weights of these polymers and copolymers are preferably within the range of 10,000 and 250,000, or even higher, although polymers having molecular weights between 40,000 and 150,000 may be used with particular advantage in the production of fibers.

In the production of fibers from the copolymers of the invention, it is necessary to prepare solutions thereof for extrusion into suitable coagulating media, i. e., evaporative or coagulating atmospheres, liquid coagulating baths, etc. In general, these spinning solutions may be prepared by heating the finely divided copolymers in the presence of a suitable solvent at temperatures between about 50–100° C. or higher depending upon the particular solvent being employed. Typical preferred solvents which may be used are various organic solvents such as N,N-dimethyl formamide, or N,N-dimethyl acetamide; or the non-nitrogen-containing solvents such as the lactones, e. g. gamma-valerolactone, gamma-butyrolactone, etc., or the cyclic carbonates, e. g. ethylene carbonate, etc. With advantage, particularly in the production of fibers, the heated mixtures of polymer and solvent are maintained in inert or oxygen-free atmospheres to minimize discoloration. These spinning solutions may have a solids content between about 15% and 30% solids depending upon the molecular weight of the polymer, and preferably between about 18% and 25%.

For various purposes it may be desirable to chemically and physically modify these polymer solutions by the presence of other materials such as, for example, pigments, plasticizers, stabilizers, spinning agents, etc.

Among the suitable liquid coagulants which may be employed with advantage with spinning solutions such as ethylene carbonate-type spinning solutions, may be mentioned glycol baths such as ethylene glycol, diethylene glycol, triethylene glycol, tetraethylene glycol, propylene glycol, dipropylene glycol, and tripropylene glycol. In general, the temperature of the ethylene carbonate-type spinning solutions at extrusion may be maintained between about 80–150° C., and the glycol coagulant at temperatures between about 50–150° C., or if desired, at a higher temperature such as, for example, up to about 175° C.

The freshly extruded and coagulated material thereafter, with advantage may be washed with an aqueous medium such as water and the washed fibers subsequently stretched up to 600–1000 percent or more. Such stretching may be accomplished in secondary baths containing materials similar to those of the coagulating medium employed, or if desired, other heated media may be employed such as, for example, inert liquids, vapors or gases, e. g., steam.

The washed and stretched products may be heat treated while in a relaxed condition at temperatures between about 100° and 180° C. to improve their physical properties.

I claim:

1. As a new composition of matter, a water-insoluble copolymer derived by the polymerization of a mixture comprising acrylonitrile and an unsaturated sulfonic acid compound selected from the group consisting of an unsaturated sulfonic acid and a water-soluble salt of an unsaturated sulfonic acid; said sulfonic acid having the formula

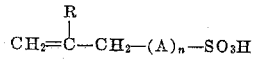

wherein $n$ is zero or 1, R is a member of the group consisting of hydrogen and methyl radicals, and A is a member of the group consisting of oxyalkylene, hydroxyalkyleneoxy, thioalkylenehydroxy and thioalkylene radicals having at least two carbon atoms when $n$ is equal to 1; said copolymer containing in the polymer molecule at least about 85% by weight of acrylonitrile and at least about 0.75% by weight of sulfonic acid groups.

2. As a new composition of matter, a water-insoluble copolymer derived by the polymerization of a mixture comprising acrylonitrile and an unsaturated sulfonic acid; said sulfonic acid having the formula

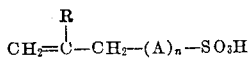

wherein $n$ is zero or 1, R is a member of the group consisting of hydrogen and methyl radicals, and A is a member of the group consisting of oxyalkylene, hydroxyalkyleneoxy, thioalkylenehydroxy and thioalkylene radicals having at least two carbon atoms when $n$ is equal to 1; said copolymer containing in the polymer molecule at least about 85% by weight of acrylonitrile and at least about 0.75% by weight of sulfonic acid groups.

3. As a new composition of matter, a water-insoluble copolymer derived by the polymerization of a mixture comprising acrylonitrile and a water-soluble salt of an unsaturated sulfonic acid; said sulfonic acid having the formula

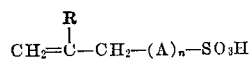

wherein $n$ is zero or 1, R is a member of the group consisting of hydrogen and methyl radicals, and A is a member of the group consisting of oxyalkylene, hydroxyalkyleneoxy, thioalkylenehydroxy and thioalkylene radicals having at least two carbon atoms when $n$ is equal to 1; said copolymer containing in the polymer molecule at least about 85% by weight of acrylonitrile and at least about 0.75% by weight of sulfonic acid groups.

4. As a new composition of matter, a water-insoluble copolymer derived by the polymerization of a mixture comprising acrylonitrile and an unsaturated sulfonic acid compound selected from the group consisting of an unsaturated sulfonic acid and a water-soluble salt of an unsaturated sulfonic acid; said sulfonic acid having the formula

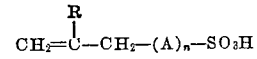

wherein $n$ is zero or 1, R is a member of the group consisting of hydrogen and methyl radicals, and A is a member of the group consisting of oxyalkylene, hydroxyalkyleneoxy, thioalkylenehydroxy and thioalkylene radicals having at least two carbon atoms when $n$ is equal to 1; said copolymer containing in the polymer molecule at least about 85% by weight of acrylonitrile and between about 0.75% and 5% by weight of sulfonic acid groups, and said copolymer having a molecular weight between about 40,000 and 150,000.

5. As a new composition of matter, a water-insoluble copolymer according to claim 2 in which the unsaturated sulfonic acid is allyl sulfonic acid.

6. As a new composition of matter, a water-insoluble copolymer according to claim 2 in which the unsaturated sulfonic acid is allyloxypropanol sulfonic acid

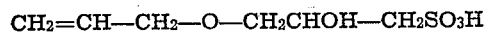

7. As a new composition of matter, a water-insoluble copolymer according to claim 2 in which the unsaturated sulfonic acid is allyloxyethyl sulfonic acid.

8. As a new composition of matter, a water-insoluble copolymer according to claim 3 in which the water-soluble salt is a sodium salt.

9. As a new composition of matter, a water-insoluble copolymer according to claim 3 in which the water-soluble salt is a potassium salt.

10. As a new composition of matter, a water-insoluble copolymer derived by the polymerization of a mixture comprising acrylonitrile and a sodium salt of allyl sulfonic acid; said copolymer containing in the polymer molecule at least about 85% by weight of acrylonitrile and at least about 0.75% by weight of sulfonic acid groups.

11. A molecularly oriented fiber which exhibits characteristic crystalline X-ray diffraction patterns comprising the copolymer as defined in claim 1.

12. A molecularly oriented fiber which exhibits characteristic crystalline X-ray diffraction patterns comprising the copolymer as defined in claim 2.

13. A molecularly oriented fiber which exhibits characteristic crystalline X-ray diffraction patterns comprising the copolymer as defined in claim 3.

14. A molecularly oriented fiber which exhibits characteristic crystalline X-ray diffraction patterns comprising the copolymer as defined in claim 5.

15. A molecularly oriented fiber which exhibits characteristic crystalline X-ray diffraction patterns comprising the copolymer as defined in claim 10.

16. A molecularly oriented fiber which exhibits characteristic crystalline X-ray diffraction patterns comprising the copolymer as defined in claim 6.

17. A molecularly oriented fiber which exhibits characteristic crystalline X-ray diffraction patterns comprising the copolymer as defined in claim 7.

18. As a new composition of matter, a water-insoluble copolymer derived by the polymerization of a mixture comprising acrylonitrile, 2-vinylpyridine and an unsaturated sulfonic acid compound selected from the group consisting of an unsaturated sulfonic acid and a water-soluble salt of an unsaturated sulfonic acid; said sulfonic acid having the formula

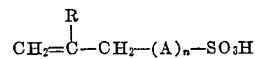

wherein $n$ is zero or 1, R is a member of the group consisting of hydrogen and methyl radicals, and A is a member of the group consisting of oxyalkylene, hydroxyalkyleneoxy, thioalkylenehydroxy and thioalkylene radicals having at least two carbon atoms when $n$ is equal to 1; said copolymer containing in the polymer molecule at least about 85% by weight of acrylonitrile, between 2% and 10% by weight of 2-vinylpyridine and at least about 0.75% by weight of sulfonic acid groups.

19. A molecularly oriented fiber comprising a water-insoluble copolymer derived by the polymerization of a mixture comprising acrylonitrile, 2-vinylpyridine and an unsaturated sulfonic acid compound selected from the group consisting of an unsaturated sulfonic acid and a water-soluble salt of an unsaturated sulfonic acid; said sulfonic acid having the formula

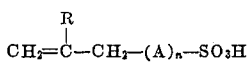

wherein $n$ is zero or 1, R is a member of the group consisting of hydrogen and methyl radicals, and A is a member of the group consisting of oxyalkylene, hydroxyalkyleneoxy, thioalkylenehydroxy and thioalkylene radicals having at least two carbon atoms when $n$ is equal to 1; said copolymer containing in the polymer molecule at least about 85% by weight of acrylonitrile, between 2% and 10% by weight of 2-vinylpyridine and between about 0.75% and 5% by weight of sulfonic acid groups, and said copolymer having a molecular weight between about 40,000 and 150,000.

20. A molecularly oriented fiber according to claim 19 in which the unsaturated sulfonic acid is allyl sulfonic acid.

21. A molecularly oriented fiber according to claim 19 in which the unsaturated sulfonic acid is alpha-methallyl sulfonic acid.

HERMAN A. BRUSON.

REFERENCES CITED

The following references are of record in the file of this patent:

UNITED STATES PATENTS

| Number | Name | Date |
| --- | --- | --- |
| 2,527,300 | Dudley | Oct. 24, 1950 |

FOREIGN PATENTS

| Number | Country | Date |
| --- | --- | --- |
| 67,658 | Norway | Apr. 3, 1944 |